(12) United States Patent
Katoh

(10) Patent No.: US 7,892,508 B2
(45) Date of Patent: Feb. 22, 2011

(54) INTERNAL COMBUSTION ENGINE EXHAUST GAS PURIFICATION APPARATUS AND METHOD FOR CONTROLLING SAME

(75) Inventor: Kenji Katoh, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/595,115

(22) PCT Filed: Jun. 6, 2008

(86) PCT No.: PCT/IB2008/001458

§ 371 (c)(1),
(2), (4) Date: Oct. 8, 2009

(87) PCT Pub. No.: WO2008/149213

PCT Pub. Date: Dec. 11, 2008

(65) Prior Publication Data

US 2010/0111794 A1 May 6, 2010

(30) Foreign Application Priority Data

Jun. 8, 2007 (JP) .............................. 2007-152747

(51) Int. Cl.
*B01D 53/56* (2006.01)
*B01D 53/94* (2006.01)
*F01N 3/10* (2006.01)

(52) U.S. Cl. .............. 423/213.2; 423/213.7; 423/239.1; 423/DIG. 5; 423/DIG. 6; 422/105; 422/108; 60/276; 60/295; 60/299; 60/301

(58) Field of Classification Search .............. 423/213.2, 423/213.7, 239.1, DIG. 5, DIG. 6; 422/105, 422/108; 60/276, 295, 299, 301
See application file for complete search history.

(56) References Cited

U.S. PATENT DOCUMENTS

| 6,616,901 | B1* | 9/2003 | Lagana et al. ................ 422/148 |
| 7,086,223 | B2* | 8/2006 | Itoh et al. ..................... 60/286 |
| 2004/0175305 | A1 | 9/2004 | Nakanishi et al. | |
| 2006/0153761 | A1 | 7/2006 | Bandl-Konrad et al. | |
| 2006/0257303 | A1 | 11/2006 | Telford | |
| 2007/0125073 | A1 | 6/2007 | Reuter | |

(Continued)

FOREIGN PATENT DOCUMENTS

EP 1 602 403 12/2005

(Continued)

*Primary Examiner*—Timothy C Vanoy
(74) *Attorney, Agent, or Firm*—Oblon, Spivak, McClelland, Maier & Neustadt, L.L.P.

(57) ABSTRACT

An internal combustion engine exhaust gas purification apparatus purifies exhaust gas using a NOx storage-reduction catalyst unit and a NOx selective reduction catalyst unit. The NOx selective reduction catalyst unit is provided downstream of the NOx storage-reduction catalyst unit in an exhaust gas passage. An urea injecting mechanism, for example an injection valve, injects urea into the exhaust gas passage. An urea injection controller prohibits urea injection from the urea injecting mechanism if at least one of the temperatures of the NOx storage-reduction catalyst unit and the NOx selective reduction catalyst unit is equal to or lower than a reference temperature. As such, production of cyanic acid is minimized, and therefore leaks of cyanic acid from the NOx storage-reduction catalyst unit and/or the NOx selective reduction catalyst unit can be suppressed.

11 Claims, 4 Drawing Sheets

U.S. PATENT DOCUMENTS

2007/0175208 A1   8/2007   Bandl-Konrad et al.

FOREIGN PATENT DOCUMENTS

| | | |
|---|---|---|
| JP | 2004 218475 | 8/2004 |
| JP | 2004 290965 | 10/2004 |
| JP | 2005 127256 | 5/2005 |
| JP | 2006 274986 | 10/2006 |
| JP | 2009-174380 A  * | 8/2009 |
| WO | 2004 061278 | 7/2004 |
| WO | 2006 121993 | 11/2006 |

* cited by examiner

INTERNAL COMBUSTION ENGINE EXHAUST GAS PURIFICATION APPARATUS AND METHOD FOR CONTROLLING SAME

BACKGROUND OF THE INVENTION

1. Field of the Invention

The invention relates to an internal combustion engine exhaust gas purification apparatus and a method for controlling the same apparatus.

2. Description of the Related Art

Exhaust gas purification apparatuses have been proposed which incorporate a high-temperature activation NOx catalyst unit and a low-temperature activation NOx catalyst unit both provided in an exhaust gas passage to remove NOx. For example, Japanese Patent Application Publication No. 2004-218475 (JP-A-2004-218475) describes an exhaust gas purification apparatus in which a NOx selective reduction catalyst unit is provided upstream of a NOx storage-reduction catalyst unit and urea is injected into the exhaust gas passage. Thus configured, this exhaust gas purification apparatus is capable of removing NOx both at a low temperature and at a high temperature. More specifically, in the exhaust gas purification apparatus described in this publication, when the temperature of the exhaust gas at the inlet of the NOx selective reduction catalyst unit is low, reducing agent (e.g., urea) is not supplied and NOx is removed at the NOx storage-reduction catalyst unit. On the other hand, when the temperature of the exhaust gas at the inlet of the NOx selective catalyst unit is high, reducing agent is supplied so that NOx is removed at the NOx selective reduction catalyst unit. For example, if urea is supplied into exhaust gas as reducing agent, ammonia ($NH_3$) is produced from the urea through its hydrolysis. This ammonia reacts with NOx at NOx selective reduction catalyst unit, whereby NOx is removed.

Further, Japanese Patent Application Publication No. 2006-274986 (JP-A-2006-274986) describes an exhaust gas purification apparatus in which a NOx selective reduction catalyst unit is provided downstream of a NOx storage-reduction catalyst unit, and fuel (HC) supplying means provided upstream of the NOx storage-reduction catalyst and urea supplying means provided upstream of the NOx selective reduction catalyst are controlled based on the temperatures of the catalyst units.

Meanwhile, when ammonia is produced from urea, if the reaction for producing ammonia is insufficient, cyanic acid (HNCO) unconvertible into ammonia may be produced. While such cyanic acid is being produced, the production amount of ammonia inevitably decreases, and thus the NOx removal rate decreases accordingly. However, JP-A-2004-218475 and JP-A-2006-274986 do not address this issue at all.

SUMMARY OF THE INVENTION

The invention provides an internal combustion engine exhaust gas purification apparatus that properly executes urea injection so as to suppress the production of cyanic acid unconvertible into ammonia and also provides a method for controlling such an internal combustion engine exhaust gas purification apparatus.

The first aspect of the invention relates to an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage. The internal combustion engine exhaust gas purification apparatus has: urea injecting means provided upstream of the NOx storage-reduction catalyst unit to inject urea into the exhaust gas passage; and urea injection controlling means that prohibits execution of urea injection from the urea injecting means if at least one of the temperature of the NOx storage-reduction catalyst unit and the temperature of the NOx selective reduction catalyst unit is equal to or lower than a reference temperature.

According to the internal combustion engine exhaust gas purification apparatus of the first aspect of the invention, exhaust gas can be properly purified by the NOx storage-reduction catalyst unit and the NOx selective catalyst unit. The NOx selective reduction catalyst unit is provided downstream of the NOx storage-reduction catalyst unit in the exhaust gas passage. The internal combustion engine exhaust gas purification apparatus further has the urea injecting means and the urea injection controlling means. The urea injecting means is, for example, an urea injection valve adapted to inject urea into the exhaust gas passage. The urea injection controlling means is, for example, an ECU (Electronic Control Unit) that is adapted to prohibit execution of the urea injection from the urea injecting means if, at least one of the temperature of the NOx storage-reduction catalyst unit and the temperature of the NOx selective reduction catalyst unit is equal or lower than the reference temperature. The reference temperature corresponds to a catalyst temperature at and below which the cyanic acid produced from the urea is not converted into ammonia, and it may be empirically determined in advance. Thus, if one or both of the catalyst temperatures is lower than the reference temperature, there is a possibility that the cyanic acid that has not been converted into ammonia leaks from the NOx storage-reduction catalyst unit and/or from the NOx selective reduction catalyst unit. According to the internal combustion engine exhaust gas purification apparatus of the first aspect of the invention, however, the production of such cyanic acid unconvertible into ammonia is minimized by prohibiting execution of the urea injection from the urea injecting means, and thus leaks of cyanic acid from the NOx storage-reduction catalyst unit and/or the NOx selective reduction catalyst unit can be suppressed.

The second aspect of the invention relates to an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage. This internal combustion engine exhaust gas purification apparatus further has: urea injecting means provided upstream of the NOx storage-reduction catalyst unit to inject urea into the exhaust gas passage; ammonia production amount detecting means provided downstream of the urea injecting means to detect the amount of produced ammonia; and urea injection controlling means that calculates an ammonia conversion rate based on the amount of urea injected from the urea injecting means and the produced ammonia amount and prohibits execution of urea injection from the urea injecting means if the calculated ammonia conversion rate is equal to or lower than a reference rate.

According to the internal combustion engine exhaust gas purification apparatus of the second aspect of the invention, exhaust gas can be properly purified by the NOx storage-reduction catalyst unit and the NOx selective catalyst unit. The internal combustion engine exhaust gas purification apparatus of the second aspect of the invention further has the urea injecting means, the ammonia production amount detecting means, and the urea injection controlling means. The urea injecting means is, for example, an urea injection valve adapted to inject urea into the exhaust gas passage. The ammonia production amount detecting means is, for example, an $NH_3$ sensor. The urea injection controlling means is, for example, an ECU that is adapted to calculate the ammonia conversion rate based on the amount of urea injected from the urea injecting means and the produced ammonia amount and prohibits execution of urea injection from the urea injecting means if the calculated ammonia conversion rate is equal to or lower than a reference rate. The reference rate may be a rate at and below which it can be presumed that cyanic acid produced from urea is not being converted into ammonia, and the reference rate may be empirically determined in advance. That is, if the ammonia conversion rate is equal to or lower than the reference rate, there is a possibility that cyanic acid unconvertible into ammonia leaks from the NOx storage-reduction catalyst unit and/or from the NOx selective reduction catalyst. According to the internal combustion engine exhaust gas purification apparatus of the second aspect of the invention, however, the production of such cyanic acid unconvertible into ammonia is minimized by prohibiting execution of the urea injection from the urea injecting means, and thus leaks of cyanic acid from the NOx storage-reduction catalyst unit and/or the NOx selective reduction catalyst unit can be suppressed.

The third aspect of the invention relates to a method for controlling an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage. This method includes: detecting at least one of the temperature of the NOx storage-reduction catalyst unit and the temperature of the NOx selective reduction catalyst unit; and prohibiting, if the at least one of the temperature of the NOx storage-reduction catalyst unit and the temperature of the NOx selective reduction catalyst unit is equal to or lower than a reference temperature, execution of urea injection from urea injecting means that is provided upstream of the NOx storage-reduction catalyst unit to inject urea into the exhaust gas passage.

According to the internal combustion engine exhaust gas purification apparatus controlling method of the third aspect of the invention, as described above, the production of cyanic acid unconvertible into ammonia can be minimized, and thus leaks of cyanic acid from the NOx storage-reduction catalyst unit and/or the NOx selective reduction catalyst unit can be suppressed.

The forth aspect of the invention relates to a method for controlling an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage. This method includes: detecting an ammonia production amount at the downstream side of urea injecting means provided upstream of the NOx storage-reduction catalyst unit to inject urea into the exhaust gas passage; calculating an ammonia conversion rate based on the amount of the urea injected from the urea injecting means and the detected ammonia production amount; and prohibiting execution of urea injection from the urea injecting means if the calculated ammonia conversion rate is equal to or lower than a reference value.

According to the internal combustion engine exhaust gas purification apparatus controlling method of the fourth aspect of the invention, as described above, the production of cyanic acid unconvertible into ammonia can be minimized, and thus leaks of cyanic acid from the NOx storage-reduction catalyst unit and/or the NOx selective reduction catalyst unit can be suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE EMBODIMENTS

Hereinafter, example embodiments of the invention will be described with reference to the accompanying drawings.

First, the first example embodiment of the invention will be described.

Figure 1:
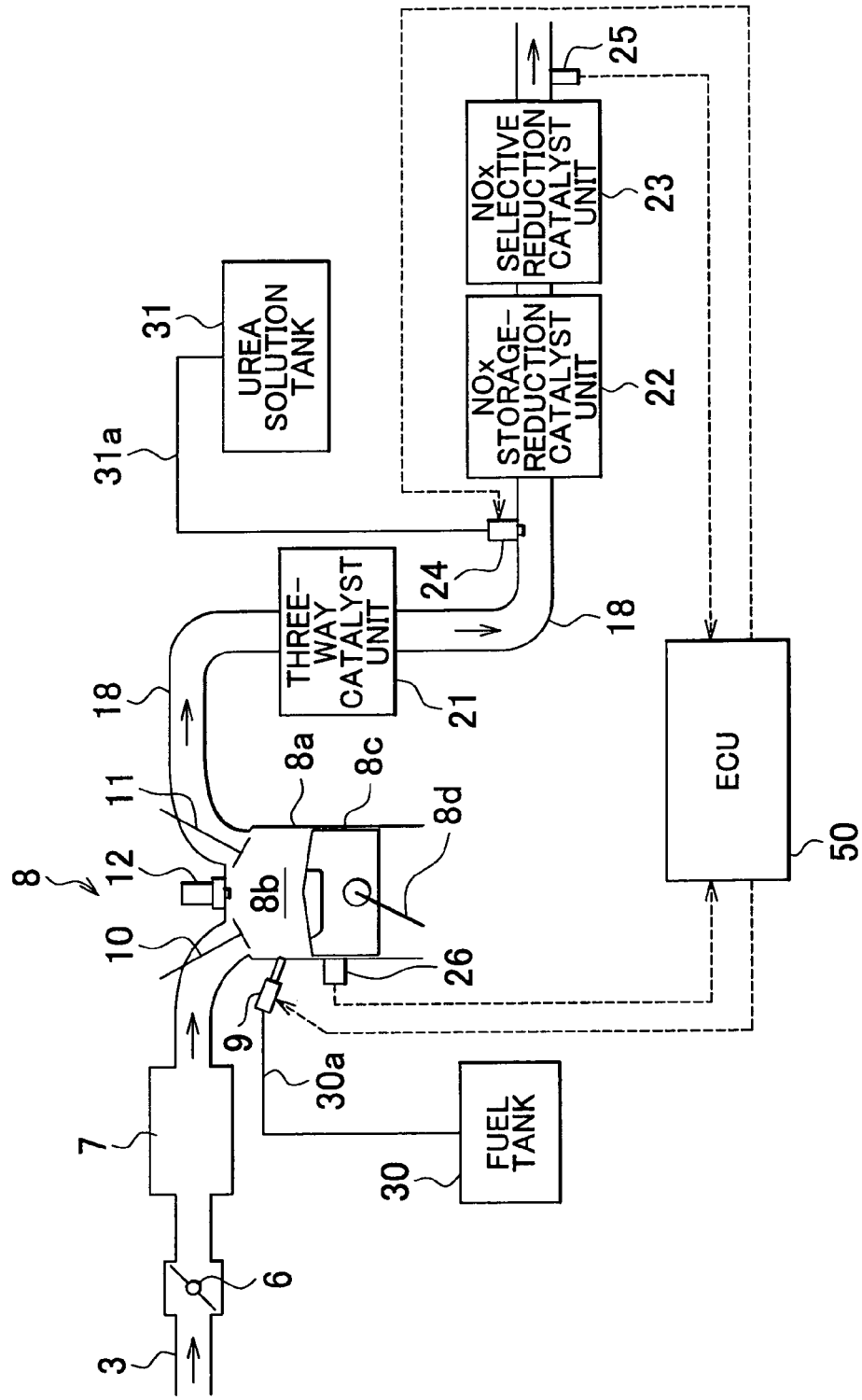
FIG. 1 is a view schematically showing the configuration of an internal combustion engine incorporating an internal combustion engine exhaust gas purification apparatus according to the first example embodiment of the invention.

FIG. 1 schematically shows the configuration of a vehicle 100 incorporating an internal combustion engine exhaust gas purification apparatus according to the first example embodiment of the invention. In FIG. 1, the solid arrows represent gas flows, and the dotted arrows represent signal inputs and outputs.

The vehicle 100 has an intake air passage 3, a throttle valve 6, a surge tank 7, an engine (internal combustion engine) 8, a fuel injection valve 9, an exhaust gas passage 18, a three-way catalyst unit 21, a NOx storage-reduction catalyst unit 22, a NOx selective reduction catalyst unit 23, an urea injection valve 24, an exhaust gas temperature sensor 25, a fuel tank 30, an urea solution tank 31, and ECU (Electronic Control Unit) 50.

The intake air passage 3 is a passage though which intake air is supplied to the engine 8. The throttle valve 6 and the surge tank 7 are provided in the intake air passage 3. The throttle valve 6 is used to adjust the amount of intake air to be supplied to the engine 8, and the surge tank 7 is used to store intake air to be supplied to the engine 8. The engine 8 is supplied with intake air delivered via the intake air passage 3 and fuel injected from the fuel injection valve 9. More specifically, intake air and fuel are supplied to a combustion chamber 8b of a cylinder 8a. That is, fuel is stored in the fuel tank 30, and it is supplied to the fuel injection valve 9 via a fuel supply passage 30a and then supplied to the combustion chamber 8b from the fuel injection valve 9. The fuel injection valve 9 is controlled by control signals from the ECU 50.

An air-fuel mixture formed of the intake air and fuel supplied to the combustion chamber 8b is ignited by an ignition plug 12 and combusted in the combustion chamber 8b. As the air-fuel mixture is thus combusted in the combustion chamber 8b, a piston 8c reciprocates. This reciprocation of the combustion chamber 8b is transmitted to the crankshaft of the engine 8, which is not shown in the drawings, through a connecting rod 8d, whereby the crankshaft rotates. It is to be noted that although FIG. 1 shows only cylinder 8a for descriptive convenience, the engine 8 may have two or more cylinders. Further, the engine 8 is not necessarily a direct injection engine (in-cylinder injection engine) in which fuel is directly supplied into the combustion chamber 8b. That is, for example, the engine 8 may alternatively be a port-injection engine in which fuel is injected into the intake air passage.

An intake valve 10 and an exhaust valve 11 are provided in the combustion chamber 8b. When the intake valve 10 is opened, the intake air passage 3 and the combustion chamber 8b communicate with each other, and when the intake valve 10 is closed, the communication between the intake air passage 3 and the combustion chamber 8b is interrupted. Likewise, when the exhaust valve 11 is opened, the exhaust gas passage 18 and the combustion chamber 8b communicate with each other, and when the exhaust valve 11 is closed, the communication between the exhaust gas passage 18 and the combustion chamber 8b is interrupted.

The exhaust gas produced as a result of combustion in the engine 8 is discharged to the exhaust gas passage 18. In the exhaust gas passage 18, the three-way catalyst unit 21, the urea injection valve 24, the NOx storage-reduction catalyst unit 22, the NOx selective reduction catalyst unit 23, and the exhaust gas temperature sensor 25 are arranged in this order from the upstream side to the downstream side. The three-way catalyst unit 21 is made of catalyst containing a rare metal (e.g., platinum and rhodium) as an active component. The three-way catalyst unit 21 is capable of removing nitrogen oxygen (NOx), carbon monoxide (CO), hydro carbon (HC), and so on, contained in exhaust gas. The three-way catalyst unit 21 serves as a so-called start catalyst. The urea injection valve 24 is a valve for injecting urea into the portion of the exhaust gas passage 18 between the three-way catalyst unit 21 and the NOx storage-reduction catalyst unit 22. Urea is stored in the urea solution tank 31 and supplied to the urea injection valve 24 via an urea supply passage 31a and then injected into the exhaust gas passage 18 from the urea injection valve 24. The urea injection valve 24 is controlled by control signals from the ECU 50. Thus, the urea injection valve 24 may be regarded as one example of "urea injecting means" in the claims.

The NOx storage-reduction catalyst unit 22 is a high-temperature activation type catalyst unit that adsorbs NOx contained in exhaust gas and then reduces the NOx stored. More specifically, when the air-full ratio of exhaust gas is lean, NOx is adsorbed to the NOx storage-reduction catalyst unit 22, and when the air-full ratio of exhaust gas is rich or at the stoichiometric level, the NOx stored in the NOx storage-reduction catalyst unit 22 is reduced by reducing agents (e.g., $H_2$, CO, HC). For example, when the NOx storage-reduction catalyst unit 22 has adsorbed NOx up to the limit of its capacity, the ECU 50 executes, so-called rich-spike control (RS control) to make the air-fuel ratio of exhaust gas rich forcibly, whereby the NOx stored in the NOx storage-reduction catalyst unit 22 is reduced. Thus, the NOx storage-reduction catalyst unit 22 is a so-called NSR (NOx Storage Reduction) catalyst unit.

The NOx selective reduction catalyst unit 23 is a low-temperature activation type catalyst that selectively reduces NOx in the presence of reducing agent (e.g., ammonia). More specifically, the urea injected from the urea injection valve 24 is hydrolyzed through reaction with exhaust gas, so that ammonia is produced, and NOx is then reduced by the produced ammonia at the NOx selective reduction catalyst unit 23. Thus, the NOx selective reduction catalyst unit 23 is a so-called SCR (Selective Catalytic Reduction) catalyst unit.

In the internal combustion engine exhaust gas purification apparatus of the first example embodiment, the urea injection valve 24 is provided upstream of the NOx storage-reduction catalyst unit 22, not between the NOx selective reduction catalyst unit 23 and the NOx storage-reduction catalyst unit 22, and urea is supplied to the NOx storage-reduction catalyst unit 22 as well as to the NOx selective reduction catalyst unit 23. The reason for this arrangement will be briefly described below.

When the air-full ratio of exhaust gas has become rich after the start of the rich-spike control, the NOx stored in the NOx storage-reduction catalyst unit 22 tends to be released from the surfaces of the NOx storage-reduction catalyst unit 22. At this time, although the exhaust gas from the engine 8 contains a large amount of reducing agent, this reducing agent is consumed at the three-way catalyst unit 21 in such an early stage of the rich-spike control, and therefore almost no reducing agent is supplied to the NOx storage-reduction catalyst unit 22. Thus, the NOx released from the NOx storage-reduction catalyst unit 22 is leaked to the outside as it is. Subsequently, when oxygen, etc., have been removed from the three-way catalyst unit 21, the reducing agent starts to be supplied to the NOx storage-reduction catalyst unit 22 and it is used to reduce the oxygen and NOx in the NOx storage-reduction catalyst unit 22. Urea is injected from the urea injection valve 24 before the rich-spike control, so that NOx in the NOx storage-reduction catalyst unit 22 is removed therefrom (i.e., NOX is reduced to nitrogen, which is non-toxic) due to the ammonia produced from the injected urea. Thus, the reason why the urea injection valve 24 is provided upstream of the NOx storage-reduction catalyst unit 22 is to suppress leaks of NOx that tend to occur in an early stage of the rich-spike control. Further, because the urea injection valve 24 is located upstream of the NOx storage-reduction catalyst unit 22, even if cyanic acid and ammonia (will be described in detail later) produced from the injected urea leak from the NOx storage-reduction catalyst unit 22, they are consumed to reduce NOx at the NOx selective reduction catalyst unit 23 on the downstream side of the NOx storage-reduction catalyst unit 22, whereby the cyanic acid and ammonia leaked to the outside are minimized.

The exhaust gas temperature sensor 25 is a sensor for detecting the temperature of the exhaust gas on the downstream side of the NOx selective reduction catalyst unit 23. The exhaust gas temperature sensor 25 inputs detection signals indicating the detected exhaust gas temperature to the ECU 50.

The coolant temperature sensor 26 is a sensor for detecting the temperature of the coolant circulated in the water jacket formed in the engine 8. The coolant temperature sensor 26 inputs detection signals indicating the detected coolant temperature to the ECU 50.

The ECU 50 is constituted of a CPU (Central Processing Unit), a ROM (Read Only Memory), a RAM (Random Access Memory), AD converters, and so on, none of which is shown in the drawings. The ECU 50 executes various vehicle operation controls based on the outputs from various sensors provided in the vehicle. For example, the ECU 50 determines the operation state of the engine 8 based on the outputs from a load sensor, a rotation sensor, and at least one of catalyst temperature sensors provided at the NOx storage-reduction catalyst unit 22 and the NOx selective reduction catalyst unit 23. The ECU 50 determines the temperature of the exhaust gas on the downstream side of the NOx selective reduction catalyst unit 23 based on the detection signals input from the exhaust gas temperature sensor 25. In the internal combustion engine exhaust gas purification apparatus of the first example embodiment, the ECU 50 determines whether to inject urea from the urea injection valve 24 to the exhaust gas passage 18 based on the operation state of the engine 8 and based on at least one of the temperature of the NOx storage-reduction catalyst unit 22 and the temperature of the NOx selective reduction catalyst unit 23 (or the temperature of the exhaust gas on the downstream side of the NOx selective reduction catalyst unit 23). As such, the ECU 50 may be regarded as one example of "urea injection controlling means" in the claims.

In the following, the control procedure implemented by the ECU 50 will be described in detail. As mentioned earlier, in the internal combustion engine exhaust gas purification apparatus of the first example embodiment, the ECU 50 determines whether to inject urea from the urea injection valve 24 to the exhaust gas passage 18 based on the operation state of the engine 8 and based on at least one of the temperature of the NOx storage-reduction catalyst unit 22 and the temperature of the NOx selective reduction catalyst unit 23 (or the temperature of the exhaust gas on the downstream side of the NOx selective reduction catalyst unit 23). That is, for the purpose of suppressing the production of cyanic acid unconvertible into ammonia, even if the present operation state of the engine 8 is satisfying all the conditions for executing urea injection (will be referred to as "urea injection conditions" where necessary), the engine 8 determines whether to inject urea based on at least one of the temperature of the NOx storage-reduction catalyst unit 22 and the temperature of the NOx selective reduction catalyst unit 23 (or the temperature of the exhaust gas on the downstream side of the NOx selective reduction catalyst unit 23), as will be described in more detail below.

First, in principle, the ECU 50 executes the urea injection from the urea injection valve 24 into the exhaust gas passage 18 when predetermined urea injection conditions are all satisfied. More specifically, the urea injection conditions include the engine 8 not being presently warmed up, the engine 8 running at a high engine speed and at high load, and the NOx storage-reduction catalyst unit 22 and/or the NOx selective reduction catalyst unit 23 having not degraded. In principle, as long as these urea injection conditions are all satisfied, the ECU 50 executes the urea injection from the urea injection valve 24 to the exhaust gas passage 18. The reason why the engine 8 needs to be running at a high engine speed and at high load when injecting urea to the exhaust gas passage 18 is that the amount of NOx that enters the NOx storage-reduction catalyst unit 22 and/or the NOx selective reduction catalyst unit 23 is considered to be relatively large when the engine 8 is running at a high engine speed and at high load.

In the internal combustion engine exhaust gas purification apparatus of the first example embodiment, however, even in a case where the above urea injection conditions are all satisfied, if cyanic acid unconvertible to ammonia is likely to be produced, the ECU 50 prohibits execution of the urea injection from the urea injection valve 24 to the exhaust gas passage 18. The reason for this prohibition will be described in detail below.

To begin with, the mechanism of production of cyanic acid will be described. When urea ((NH$_2$)$_2$CO) is injected into exhaust gas of a typical gasoline engine, it is hydrolyzed through reactions with the exhaust gas, and as a result ammonia (NH$_3$) is produced. These reactions are expressed by the following chemical reaction formulas (1) and (2).

(1)

(2)

Using the ammonia produced as above, NO and NO$_2$ in the exhaust gas are removed at the NOx storage-reduction catalyst unit 22 and/or at the NOx selective reduction catalyst unit 23. More specifically, at this time, NO and NO$_2$ are reduced to nitrogen (N$_2$) as represented by the following chemical reaction formulas (3) to (5).

(3)

(4)

(5)

As is evident from the chemical reaction formula (1), cyanic acid (HNCO) is produced as an intermediate in the process of ammonia being produced from the urea. If the temperature of the NOx storage-reduction catalyst unit 22 and/or the temperature of the NOx selective reduction catalyst unit 23 are low, the ammonia production reaction becomes insufficient. More specifically, if the temperature of the NOx storage-reduction catalyst unit 22 and/or the temperature of the NOx selective reduction catalyst unit 23 are low, it makes it relatively difficult for the reaction of the chemical reaction formula (2) to occur. In this case, because only the reaction of the chemical reaction formula (1) occurs, cyanic acid unconvertible into ammonia may be produced, and the produced cyanic acid may be leaked from the NOx storage-reduction catalyst unit 22 and/or the NOx selective reduction catalyst unit 23.

In view of the issue described above, in the internal combustion engine exhaust gas purification apparatus of the first example embodiment, the ECU 50 is adapted to prohibit urea injection from the urea injection valve 24 if the temperature of the NOx storage-reduction catalyst unit 22 and/or the temperature of the NOx selective reduction catalyst unit 23 are lower than a reference temperature (i.e., in a state where cyanic acid is likely to be produced). In this case, because urea is not injected from the urea injection valve 24, the production of cyanic acid unconvertible into ammonia is minimized, and leaks of cyanic acid from the NOx storage-reduction catalyst unit 22 and/or the NOx selective reduction catalyst unit 23 can be suppressed.

Figure 2:
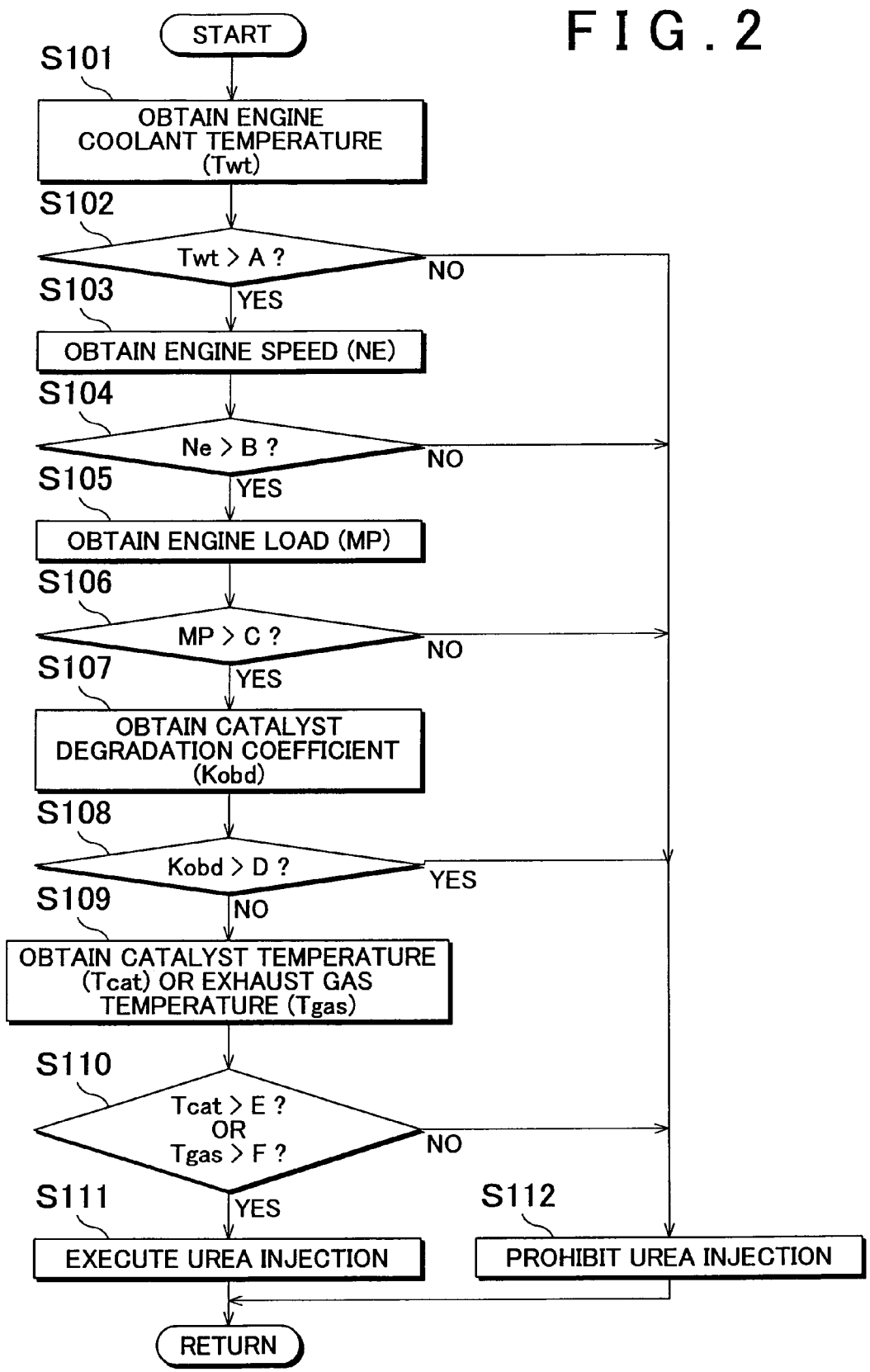
FIG. 2 is a flowchart illustrating a control routine executed by the internal combustion engine exhaust gas purification apparatus of the first example embodiment of the invention.

In the following, a control routine executed in the internal combustion engine exhaust gas purification apparatus of the first example embodiment will be described with reference to the flowchart shown in FIG. 2. This control routine is repeatedly executed by the ECU 50 at given time intervals. Reference values A, B, C, and D, which will be described below, are values used to determine whether to execute urea injection, and they are empirically determined and recorded in the ROM of the ECU 50, or the like.

After the start of the control routine, the ECU 50 first determines a temperature Twt of the coolant of the engine 8 based on the detection signals from the coolant temperature sensor 26 in step S101. Then, in step S102, the ECU 50 determines whether the determined coolant temperature Twt is higher than a reference temperature A. That is, in step S102, the ECU 50 refers to the coolant temperature Twt to determine whether the engine 8 is being presently warmed up. If it is determined in step S102 that the coolant temperature Twt is equal to or lower than the reference temperature A (step S102: NO), it indicates that the engine 8 is presently being warmed up. In this case, therefore, the ECU 50 proceeds to step S112 and prohibits execution of the urea injection from the urea injection valve 24. On the other hand, if it is determined in step S102 that the coolant temperature Twt is higher than the reference temperature A (step S102: YES), it indicates that the engine 8 has already been warmed up. In this case, the ECU 50 proceeds to step S103.

In step S103, the ECU 50 determines an engine speed NE based on the detection signals input from the rotation sensor. Then, in step S104, the ECU 50 determines whether the determined engine speed NE is higher than a reference value B. That is, in step S104, the ECU 50 determines whether the engine 8 is running in a predetermined high engine speed range based on the engine speed NE. If it is determined in step S104 that the engine speed NE is equal to or lower than the reference value B (step S104: NO), it indicates that the present engine speed of the engine 8 is not in the predetermined high engine speed range. In this case, therefore, the ECU 50 proceeds to step S112 and prohibits execution of urea injection. On the other hand, if it is determined in step S104 that the engine speed NE is higher than the reference value B (step S104: YES), it indicates that the present engine speed of the engine 8 is in the predetermined high engine speed range. In this case, the ECU 50 proceeds to step S105.

In step S105, the ECU 50 determines an engine load MP based on the detection signals input from the load sensor. Then, in step S106, the ECU 50 determines whether the engine load MP is larger than a reference value C. That is, in step S106, the ECU 50 refers to the engine load MP to determine whether the present engine load is in a predetermined high engine load range. If it is determined in step S106 that the engine load MP is equal to or smaller than the reference value C (step S106: NO), it indicates that the present load on the engine 8 is not in the predetermined high engine load range. In this case, therefore, the ECU 50 proceeds to step S112 and prohibits execution of the urea injection from the urea injection valve 24. On the other hand, if it is determined in step S106 that the engine load MP is larger than the reference value C (step S106: YES), it indicates that the present load on the engine 8 is in the predetermined high engine load range. In this case, the ECU 50 proceeds to step S107.

In step S107, the ECU 50 determines a catalyst degradation coefficient Kobd based on the detection signals input from at least one of the catalyst temperature sensors provided at the NOx storage-reduction catalyst unit 22 and the NOx selective reduction catalyst unit 23, and so on. Then, in step S108, the ECU 50 determines whether the catalyst degradation coefficient Kobd is larger than a reference value D. That is, in step S108, the ECU 50 refers to the catalyst degradation coefficient Kobd to determine whether the NOx storage-reduction catalyst unit 22 and/or the NOx selective reduction catalyst unit 23 have degraded. If it is determined in step S108 that the catalyst degradation coefficient Kobd is larger than the reference value D (step S108: YES), it indicates that the NOx storage-reduction catalyst unit 22 and/or the NOx selective reduction catalyst unit 23 have already degraded. In this case, therefore, the ECU 50 proceeds to step S112 and prohibits execution of the urea injection from the urea injection valve 24. On the other hand, if it is determined in step S108 that the catalyst degradation coefficient Kobd is equal to or smaller than the reference value D (step S108: NO), it indicates that the NOx storage-reduction catalyst unit 22 and/or the NOx selective reduction catalyst unit 23 have not degraded yet. In this case, the ECU 50 proceeds to step S109.

As such, by executing the processes in step S101 to step S108, the ECU 50 determines whether the present operation state of the engine 8 is satisfying all the urea injection conditions.

In step S109, the ECU 50 determines a temperature Tcat of the NOx storage-reduction catalyst unit 22 and/or the NOx selective reduction catalyst unit 23 based on the detection signals from the catalyst sensors provided at the NOx storage-reduction catalyst unit 22 and/or the NOx selective reduction catalyst unit 23, or the ECU 50 determines a temperature Tgas of the exhaust gas on the downstream side of the NOx selective reduction catalyst unit 23 based on the detection signals from the exhaust gas temperature sensor 25. Then, in step S110, the ECU 50 determines whether the temperature Tcat of the NOx storage-reduction catalyst unit 22 and/or the NOx selective reduction catalyst unit 23 is higher than a reference temperature E (or whether the exhaust gas temperature Tgas is higher than a reference temperature F). The reference temperature E is set to such a value that cyanic acid produced from urea is unconvertible into ammonia when the catalyst temperature Tcat is equal to or lower than the reference temperature E. Likewise, the reference temperature F is set to such a value that cyanic acid produced from urea is unconvertible into ammonia when the exhaust gas temperature Tgas is equal to or lower than the reference temperature F. The reference temperatures E and F are empirically determined and recorded in the ROM of the ECU 50, or the like.

If it is determined in step S110 that the catalyst temperature Tcat of the NOx storage-reduction catalyst unit 22 and/or the NOx selective reduction catalyst unit 23 is equal to or lower than the reference temperature E (or if it is determined that the exhaust gas temperature Tgas is equal to or lower than the reference temperature F) (step S110: NO), the ECU 50 proceeds to step S112 and prohibits execution of the urea injection from the urea injection valve 24. On the other hand, if it is determined in step S110 that the catalyst temperature Tcat of the NOx storage-reduction catalyst unit 22 and/or the NOx selective reduction catalyst unit 23 is higher than the reference temperature E (or if it is determined that the exhaust gas temperature Tgas is higher than the reference temperature F) (step S110: YES), the ECU 50 executes the urea injection from the urea injection valve 24 (step S111). The ECU 50 repeats the processes in step S101 to step S112.

According to the control routine described above, even when the operation state of the engine 8 is satisfying all the urea injection conditions, if the catalyst temperature Tcat of the NOx storage-reduction catalyst unit 22 and/or the NOx selective reduction catalyst unit 23 is equal to or lower than the reference temperature E (or if the exhaust gas temperature Tgas is equal to or lower than the reference temperature F), the urea injection from the urea injection valve 24 is prohibited. As a result, the urea injection from the urea injection valve 24 is not executed, and therefore production of cyanic acid unconvertible into ammonia is suppressed.

Next, the second example embodiment of the invention will be described. In the internal combustion engine exhaust gas purification apparatus of the first example embodiment, as described above, the urea injection from the urea injection valve 24 is prohibited if the temperature of the NOx storage-reduction catalyst unit 22 and/or the NOx selective reduction catalyst unit 23 is equal to or lower than the reference temperature E (or if the temperature of the exhaust gas on the downstream side of the NOx selective reduction catalyst unit 23 is equal to or lower than the reference temperature F). In the internal combustion engine exhaust gas purification apparatus of the second example embodiment, on the other hand, the rate of conversion from urea to ammonia (will hereinafter be referred to as "ammonia conversion rate" where necessary) is used as a parameter for determining whether to prohibit the urea injection from the urea injection valve 24, instead of the temperature of the NOx storage-reduction catalyst unit 22 and/or the NOx selective reduction catalyst unit 23.

As mentioned earlier, after urea has been injected from the urea injection valve 24 into exhaust gas, ammonia ($NH_3$) and cyanic acid (HNCO) are produced from the injected urea (($NH_2)_2CO$)) as represented by the chemical reaction formula (1). Then, as the reaction further proceeds, the cyanic acid (HNCO) and water ($H_2O$) react with each other, so that ammonia ($NH_3$) and carbon oxide (CO) are produced as represented by the chemical reaction formula (2). That is, ammonia is also produced as a result of the reaction of the chemical reaction formula (2). Therefore, in a case where the urea reaction has stopped at the reaction of the chemical reaction formula (1), the amount of ammonia converted from urea is small as compared to a case where the urea reaction have gone through both the reactions of the chemical reaction formulas (1) and (2). More specifically, as is evident from the chemical reaction formulas (1) and (2), if the reaction of the chemical reaction formula (1) and the reaction of the chemical reaction formula (2) have both occurred to 1 mole of urea, 2 moles of ammonia is produced, and if only the reaction of the chemical reaction formula (1) has occurred to 1 mole of urea, only 1 mole of ammonia is produced.

In view of the above, in the internal combustion engine exhaust gas purification apparatus of the second example embodiment, the ammonia conversion rate is calculated based on the amount of the injected urea and the amount of the produced ammonia. If the calculated ammonia conversion rate is equal to or lower than a reference value, it indicates that the urea reaction has stopped at the reaction of the chemical reaction formula (1), that is, cyanic acid unconvertible into ammonia is likely to be produced. In this case, therefore, the urea injection from the urea injection valve 24 is prohibited.

Figure 3:
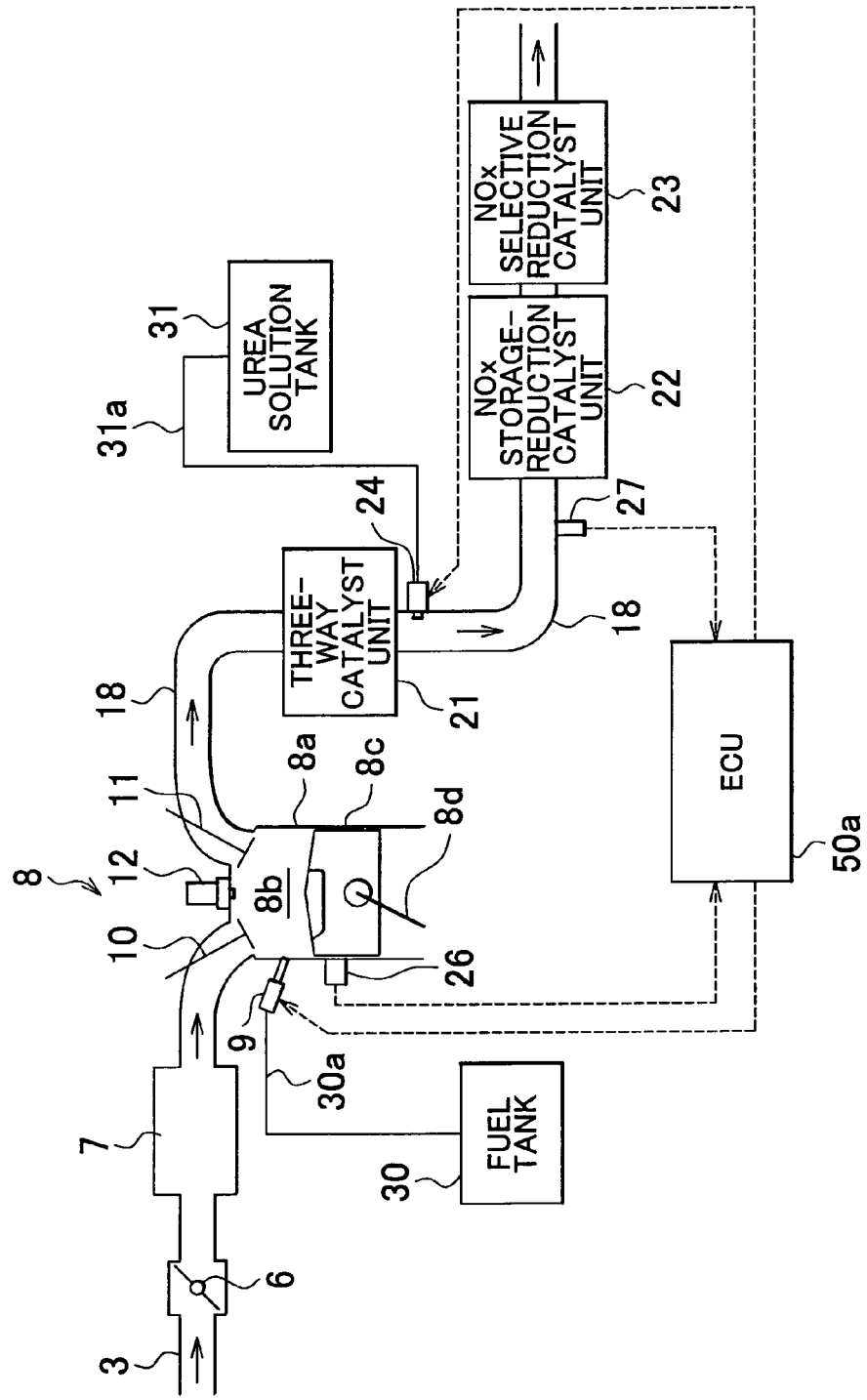
FIG. 3 is a view schematically showing the configuration of an internal combustion engine incorporating an internal combustion engine exhaust gas purification apparatus according to the second example embodiment of the invention.

FIG. 3 schematically shows the configuration of a vehicle 100a incorporating the internal combustion engine exhaust gas purification apparatus of the second example embodiment of the invention. In the following description, the same elements identical to those of the vehicle 100 (Refer to FIG. 1) are denoted by the same reference numerals and they are not described again. In FIG. 3, the solid arrows represent gas flows, and the dotted arrows represent signal inputs and outputs.

In the vehicle 100a, an $NH_3$ sensor 27 is provided in a portion of the exhaust gas passage 18 on the downstream side of the urea injection valve 24. The $NH_3$ sensor 27 detects the concentration of ammonia and sends detection signals indicating the detected ammonia concentration to an ECU 50a. Thus, the $NH_3$ sensor 27 may be regarded as one example of "ammonia production amount detecting means" in the claims. Note that a NOx sensor may be used instead of the $NH_3$ sensor 27. That is, the ammonia concentration can be detected also by a NOx sensor.

The ECU 50a is constituted of a CPU, a ROM, a RAM, AD converters, and so on, none of which is shown in the drawings. Like the ECU 50 of the internal combustion engine exhaust gas purification apparatus of the first example embodiment, the ECU 50a serves as a controller for controlling the air-fuel ratio of exhaust gas (making it rich) and controlling the urea injection from the urea injection valve 24 ("urea injection controlling means"). That is, the ECU 50a executes the rich-spike control and the urea injection control. The ECU 50a determines whether to prohibit the urea injection control based on the ammonia concentration obtained from the $NH_3$ sensor 27. More specifically, the ECU 50a determines whether to prohibit the urea injection control based on an ammonia production amount estimated based on the injection amount of urea and the actual ammonia production amount determined based on the ammonia concentration, as will be described in detail below.

To begin with, the ECU 50a determines, based on the amount of the injected urea, the amount of ammonia that is estimated to be produced from the injected urea through the reactions of the chemical reaction formulas (1) and (2) (will hereinafter be referred to as "estimated ammonia production amount" where necessary) and determines, based on the ammonia concentration obtained from the $NH_3$ sensor 27, the amount of ammonia that has been actually produced (will hereinafter be referred to as "actual ammonia production amount" where necessary). Then, the ECU 50a obtains the ammonia conversion rate from the actual ammonia production amount and the estimated ammonia production amount. At this time, if it is determined that the obtained ammonia conversion rate is equal to or lower than a reference value, it indicates that the urea reaction has stopped at the reaction of the chemical reaction formula (1) and therefore it is highly likely that cyanic acid is being produced. In this case, therefore, even if the operation state of the engine 8 is satisfying all the urea injection conditions, the ECU 50a prohibits execution of the urea injection from the urea injection valve 24 to the exhaust gas passage 18. As such, as in the first example embodiment described above, because urea is not injected from the urea injection valve 24, the production of cyanic acid unconvertible into ammonia is minimized, and thus leaks of cyanic acid from the NOx storage-reduction catalyst unit 22 and/or the NOx selective reduction catalyst unit 23 are suppressed.

Figure 4:
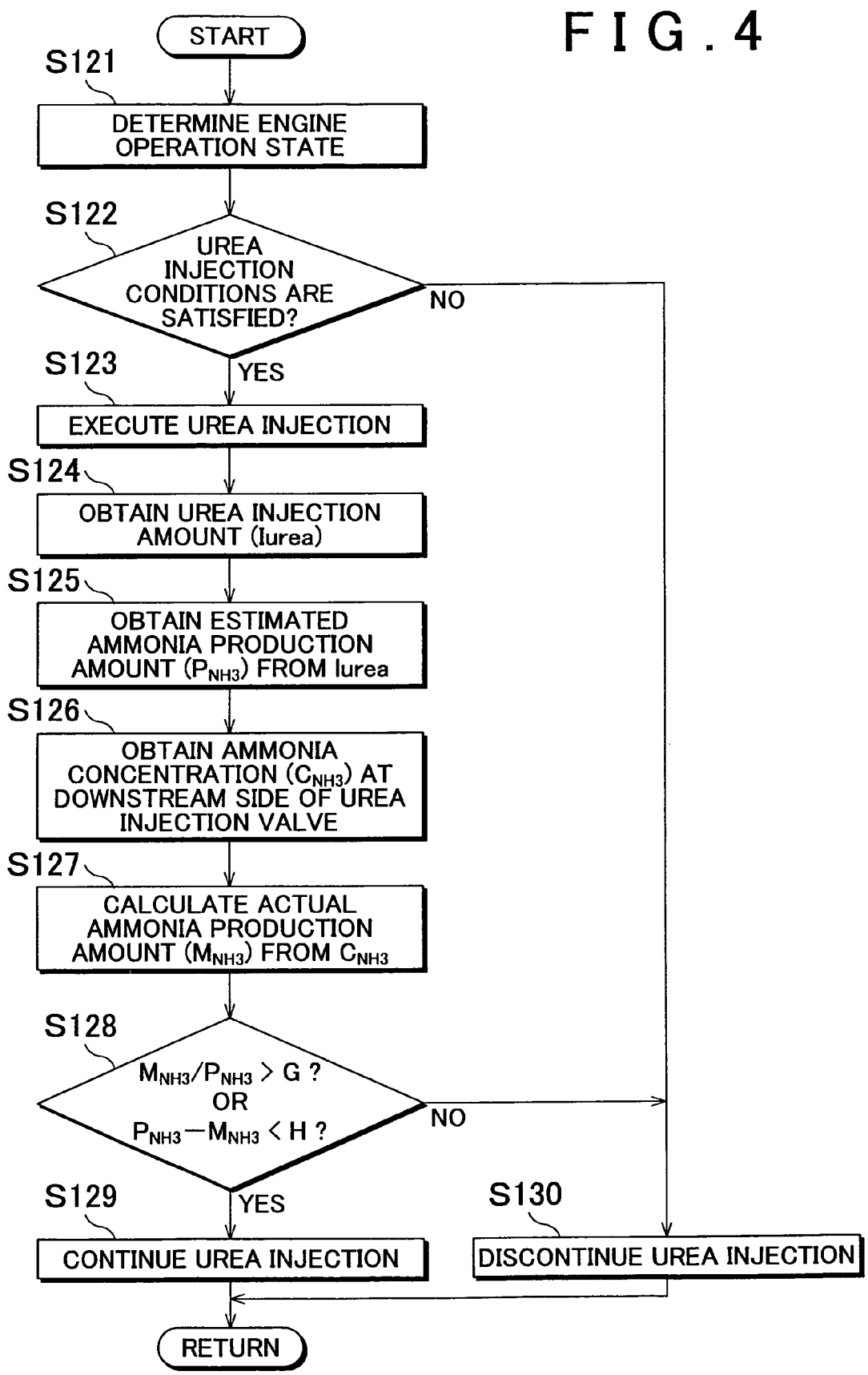
FIG. 4 is a flowchart illustrating a control routine executed by the internal combustion engine exhaust gas purification apparatus of the second example embodiment of the invention.

In the following, a control routine executed in the internal combustion engine exhaust gas purification apparatus of the second example embodiment will be described with reference to the flowchart of FIG. 4. This control routine is repeatedly executed by the ECU 50a at given time intervals.

After the start of the control routine, the ECU 50a first determines the operation state of the engine 8 in step S121. More specifically, in this step, the ECU 50a obtains the temperature Twt of the coolant of the engine 8, the engine speed NE, the engine load MP, and the catalyst degradation coefficient Kobd of the NOx storage-reduction catalyst unit 22 and/or the NOx selective reduction catalyst unit 23, as in the control routine executed in the internal combustion engine exhaust gas purification apparatus of the first example embodiment.

Subsequently, in step S122, the ECU 50a determines whether the present operation state of the engine 8 is satisfying all the urea injection conditions. More specifically, in this step, the ECU 50a determines: (1) whether the temperature Twt of the coolant of the engine 8 is higher than the reference value A; (2) the engine speed NE is higher than the reference value B; (3) the engine load MP is larger than the reference value C; and (4) the catalyst degradation coefficient Kobd of the NOx storage-reduction catalyst unit 22 and/or the NOx selective reduction catalyst unit 23 is equal to or smaller than the reference value D. If the urea injection conditions (1) to (4) are all satisfied in the present operation state of the engine 8 (step S122: YES), the ECU 50a proceeds to step S123 and executes the urea injection from the urea injection valve 24 (step S123), after which the ECU 50a proceeds to step S124. On the other hand, if any of the above urea injection conditions (1) to (4) is not satisfied in the present operation state of the engine 8 (step S122: NO), the ECU 50a then proceeds to step S130 and prohibits execution of the urea injection from the urea injection valve 24.

In step S124, the ECU 50a determines the amount of the injected urea (Iurea). More specifically, in this step, the ECU 50a determines the injected urea amount (Iurea) by multiplying the amount of urea injected from the urea injection valve 24 per unit time by the injection duration. Then, in step S125, the ECU 50a estimates, by referring to the chemical reaction formulas (1) and (2), the amount of ammonia that will be produced from the determined amount of injected urea (estimated ammonia production amount ($P_{NH3}$)).

Then, in step S126, the ECU 50a determines the ammonia concentration on the downstream side of the urea injection valve 24 (ammonia concentration ($C_{NH3}$)) based on the detection signals from the $NH_3$ sensor 27. Then, in step S127, the ECU 50a determines the amount of the ammonia actually produced (actual ammonia production amount ($M_{NH3}$)) based on the determined ammonia concentration ($C_{NH3}$).

In step S128, the ECU 50a determines, based on the estimated ammonia production amount and the actual ammonia production amount, whether the rate of conversion from urea to ammonia ($M_{NH3}/P_{NH3}$) is higher than a reference value G or whether the difference between the estimated ammonia production amount and the actual ammonia production amount ($P_{NH3}-M_{NH3}$) is smaller than a reference value H. The reference value G is set to such a value that that if the rate of conversion from urea to ammonia is equal to or lower than the reference value it is presumed that the cyanic acid produced from the injected urea is not being converted into ammonia. Likewise, the reference value H is set to such a value that if the difference between the estimated ammonia production amount and the actual ammonia production amount is equal to or larger than the reference value H, it is presumed that the cyanic acid produced from the injected urea is not being converted into ammonia. The reference values G and H are empirically determined and recorded in the ROM of the ECU 50a, or the like.

If it is determined based on the estimated ammonia production amount and the actual ammonia production amount that the rate of conversion from urea to ammonia ($M_{NH3}/P_{NH3}$) is equal to or lower than the reference value G (or if it is determined that the difference between the estimated ammonia production amount and the actual ammonia production amount ($P_{NH3}-M_{NH3}$) is equal to or larger than the reference value H) (step S128: NO), it indicates that the cyanic acid is not being converted into ammonia. In this case, therefore, the ECU 50a proceeds to step S130 and discontinues the urea injection from the urea injection valve 24. On the other hand, if it is determined that the rate of conversion from urea to ammonia is higher than the reference value G (or it is determined that the difference between the estimated urea production amount and the actual urea production amount ($P_{NH3}-M_{NH3}$) is smaller than the reference value H) (step S128: YES), it indicates that the cyanic acid is being converted into ammonia. In this case, therefore, the ECU 50a proceeds to step S129 and continues the urea injection from the urea injection valve 24.

According to the control routine described above, even in a case where the operation state of the engine 8 is satisfying all the urea injection conditions, if the ammonia conversion rate is equal to or lower than the reference value G (or if the difference between the estimated ammonia production amount and the actual ammonia production amount is equal to or larger than the reference value H), the urea injection from the urea injection valve 24 is stopped. In this case, too, because urea is not injected from the urea injection valve 24, the production of cyanic acid unconvertible into ammonia is minimized.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An internal combustion engine exhaust gas purification apparatus, comprising:
    a NOx storage-reduction catalyst unit provided in an exhaust gas passage;
    a NOx selective reduction catalyst unit provided downstream of the NOx storage-reduction catalyst unit in the exhaust gas passage;
    an urea injector provided upstream of the NOx storage-reduction catalyst unit to inject urea into the exhaust gas passage; and
    an urea injection controller that prohibits execution of urea injection from the urea injector if at least one of a temperature of the NOx storage-reduction catalyst unit and a temperature of the NOx selective reduction catalyst unit is equal to or lower than a reference temperature,
    wherein the reference temperature corresponds to a catalyst temperature at and below which cyanic acid produced from urea is not converted into ammonia.

2. The internal combustion engine exhaust gas purification apparatus according to claim 1, further comprising:
    an exhaust gas temperature sensor provided downstream of the NOx selective reduction catalyst unit to detect the temperature of the NOx selective reduction catalyst unit.

3. The internal combustion engine exhaust gas purification apparatus according to claim 1, wherein prior to determining whether at least one of the temperature of the NOx storage-reduction catalyst unit and the temperature of the NOx selective reduction catalyst unit is equal to or lower than the reference temperature, the urea injection controller detects at least one of an engine coolant temperature, an engine speed, an engine load, and a catalyst degradation coefficient and preliminarily determines, based on the result of the detection, whether to execute urea injection from the urea injector.

4. An internal combustion engine exhaust gas purification apparatus, comprising:
    a NOx storage-reduction catalyst unit provided in an exhaust gas passage;
    a NOx selective reduction catalyst unit provided downstream of the NOx storage-reduction catalyst unit in the exhaust gas passage;
    an urea injector provided upstream of the NOx storage-reduction catalyst unit to inject urea into the exhaust gas passage;
    an ammonia production amount detector provided downstream of the urea injector to detect an amount of produced ammonia; and
    an urea injection controller that calculates an ammonia conversion rate based on an amount of urea injected from the urea injector and the produced ammonia amount and prohibits execution of urea injection from the urea injector if the calculated ammonia conversion rate is equal to or lower than a reference rate.

5. The internal combustion engine exhaust gas purification apparatus according to claim 4, wherein the reference rate is a rate at and below which it can be presumed that cyanic acid produced from urea is not being converted into ammonia.

6. The internal combustion engine exhaust gas purification apparatus according to claim 4, wherein the ammonia production amount detector includes an $NH_3$ sensor or a NOx sensor.

7. The internal combustion engine exhaust gas purification apparatus according to claim 4, wherein the ammonia conversion rate is calculated by dividing an actual ammonia production amount calculated based on ammonia concentration detected by the ammonia production amount detector by an estimated ammonia production amount calculated based on the amount of the urea injected from the urea injector.

8. The internal combustion engine exhaust gas purification apparatus according to claim 4, wherein the ammonia conversion rate is calculated by subtracting an estimated ammonia production amount calculated based on the amount of the urea injected from the urea injector from an actual ammonia production amount calculated based on ammonia concentration detected by the ammonia production amount detector.

9. The internal combustion engine exhaust gas purification apparatus according to claim 4, wherein prior to determining the ammonia conversion rate, the urea injection controller detects at least one of an engine coolant temperature, an engine speed, an engine load, and a catalyst degradation coefficient and preliminarily determines, based on the result of the detection, whether to execute urea injection from the urea injector.

10. A method for controlling an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage, comprising:

detecting at least one of a temperature of the NOx storage-reduction catalyst unit and a temperature of the NOx selective reduction catalyst unit; and prohibiting, if the at least one of the temperature of the NOx storage-reduction catalyst unit and the temperature of the NOx selective reduction catalyst unit is equal to or lower than a reference temperature, execution of urea injection from an urea injecting device provided upstream of the NOx storage-reduction catalyst unit to inject urea into the exhaust gas passage, wherein the reference temperature corresponds to a catalyst temperature at and below which cyanic acid produced from urea is not converted into ammonia.

11. A method for controlling an internal combustion engine exhaust gas purification apparatus having a NOx storage-reduction catalyst unit provided in an exhaust gas passage and a NOx selective reduction catalyst unit provided downstream of the NOx storage-reduction catalyst unit in the exhaust gas passage, comprising:

detecting an ammonia production amount at the downstream side of an urea injecting device provided upstream of the NOx storage-reduction catalyst unit to inject urea into the exhaust gas passage;

calculating an ammonia conversion rate based on an amount of the urea injected from the urea injecting device and the detected ammonia production amount; and prohibiting execution of urea injection from the urea injecting device if the calculated ammonia conversion rate is equal to or lower than a reference value.

* * * * *